Jan. 10, 1939.　　　A. F. POTT　　　2,143,741
SHIFT DEVICE FOR CALCULATING MACHINES
Filed Sept. 23, 1931　　　11 Sheets-Sheet 6
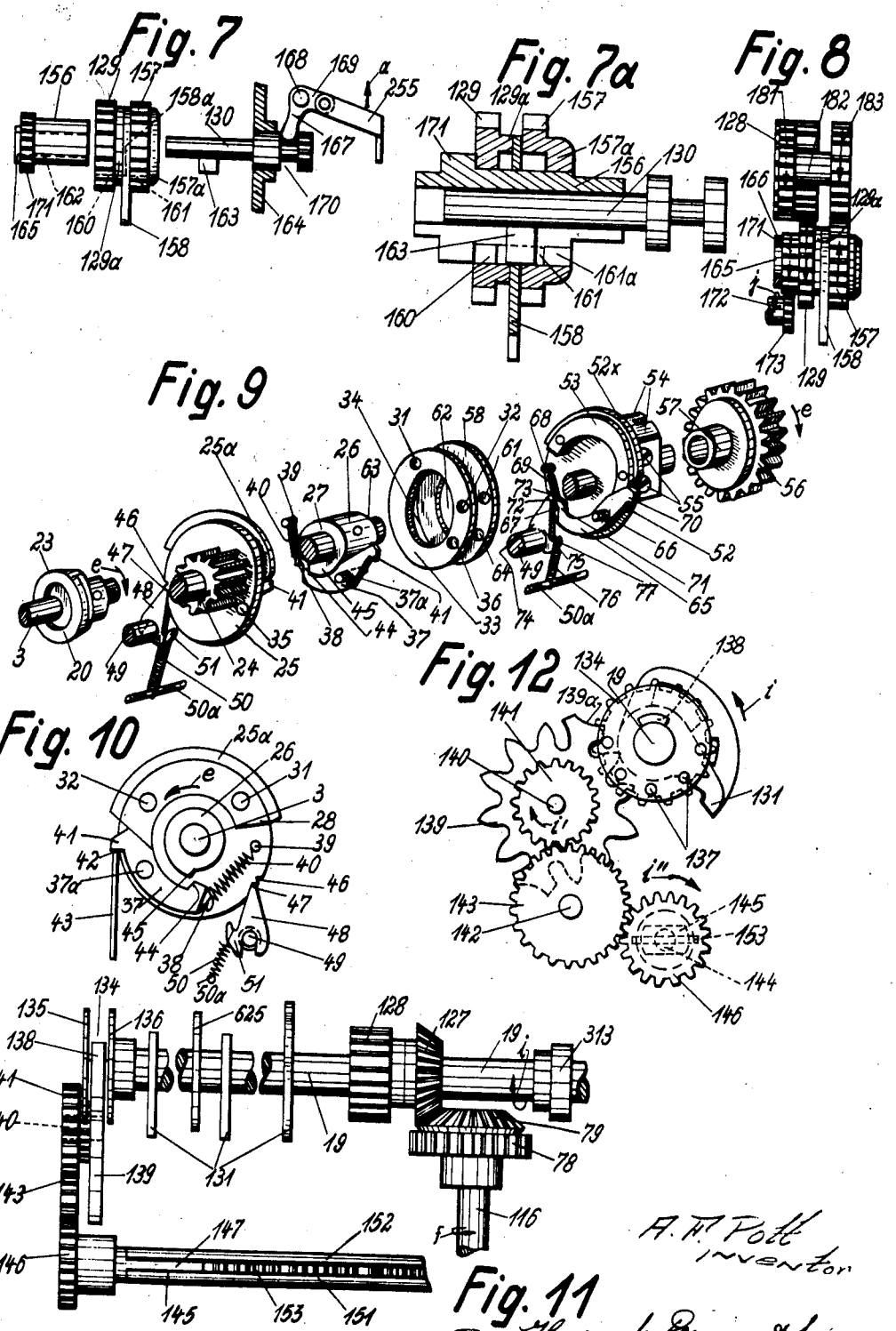

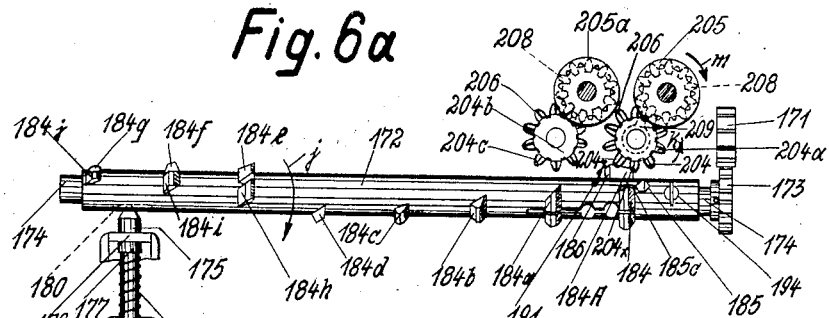
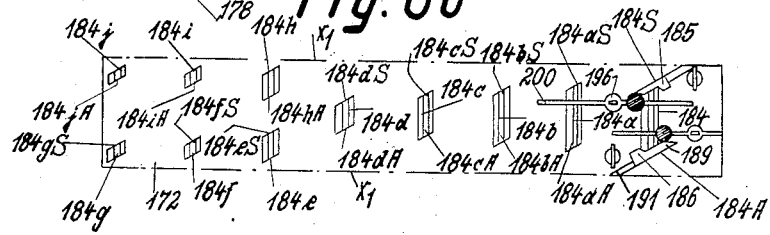
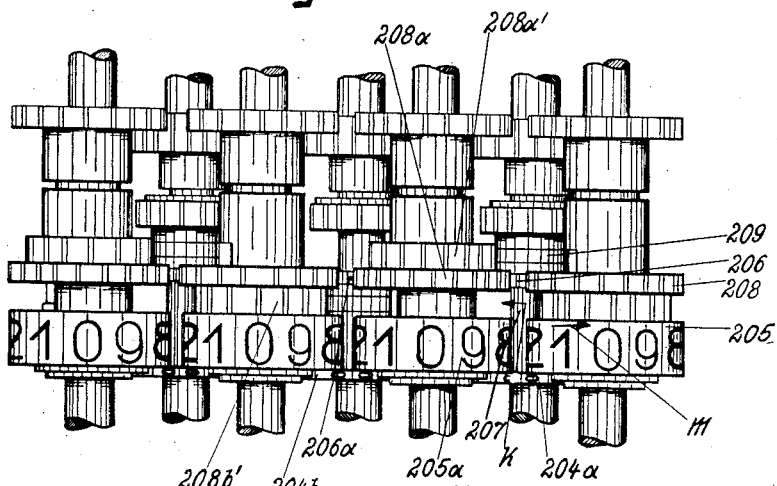
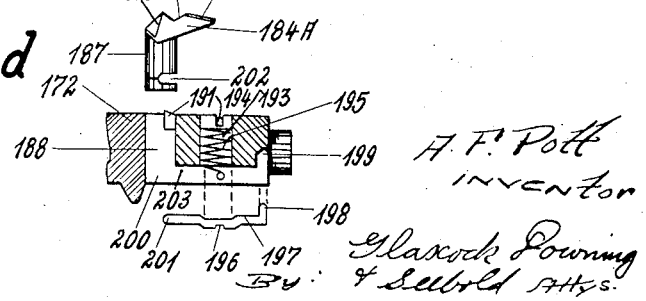

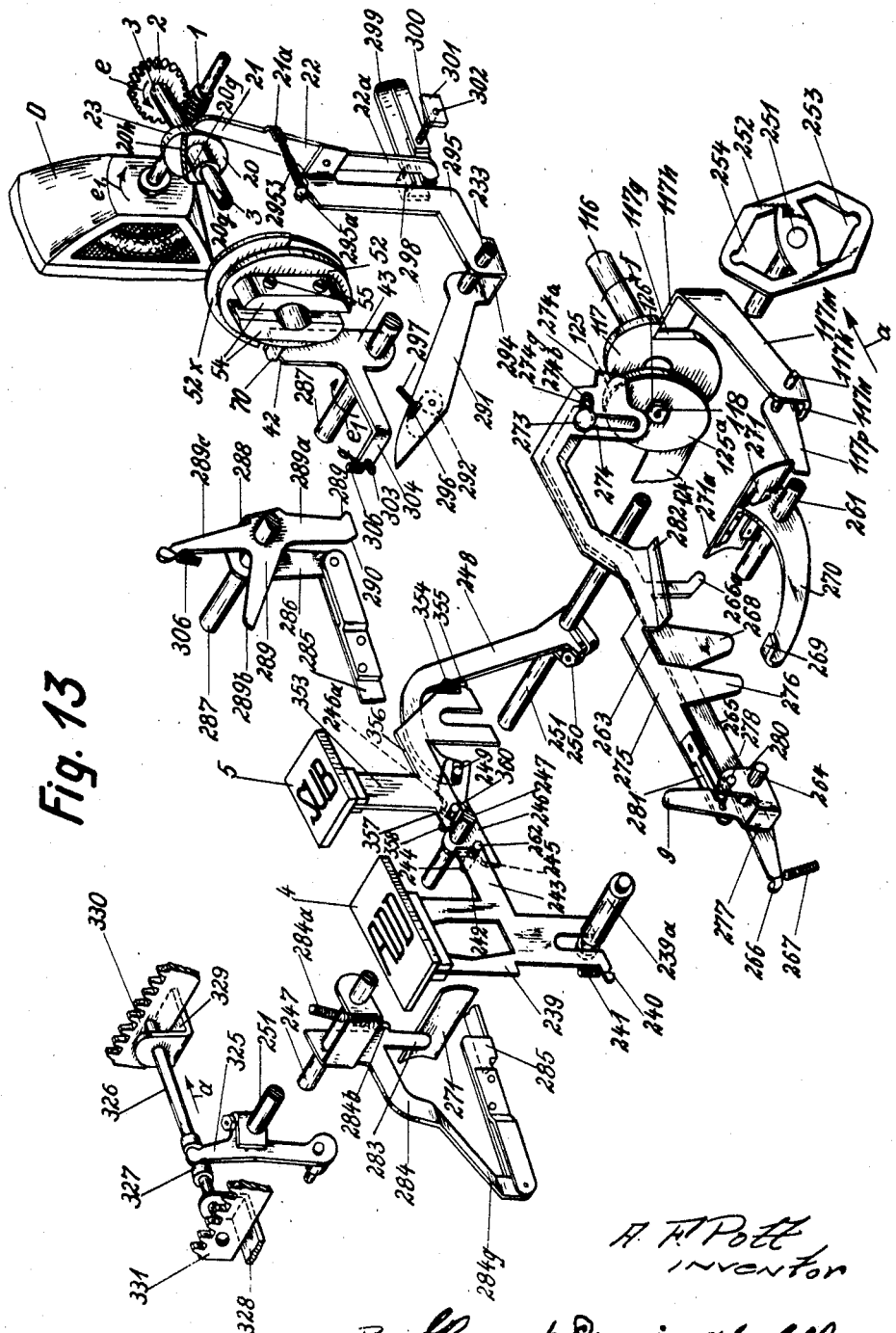

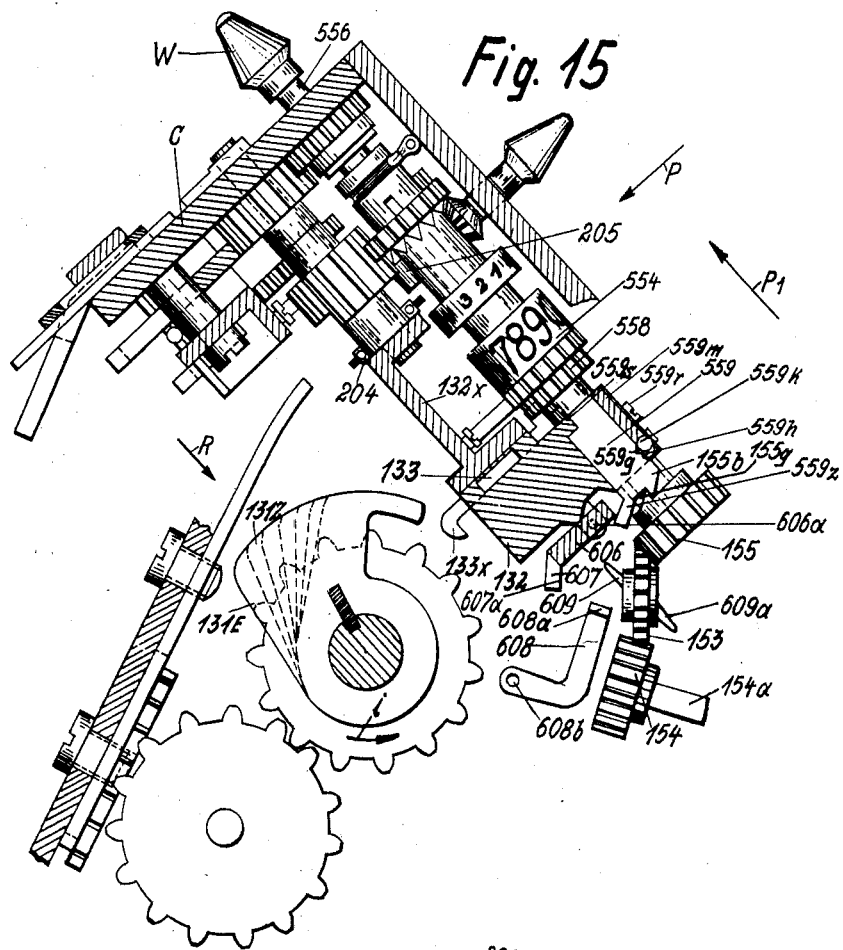
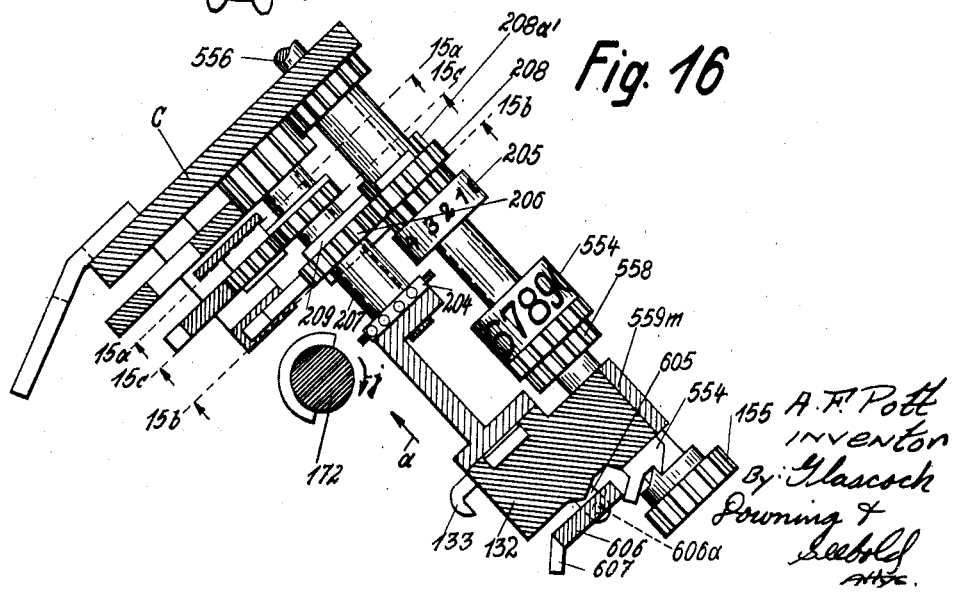

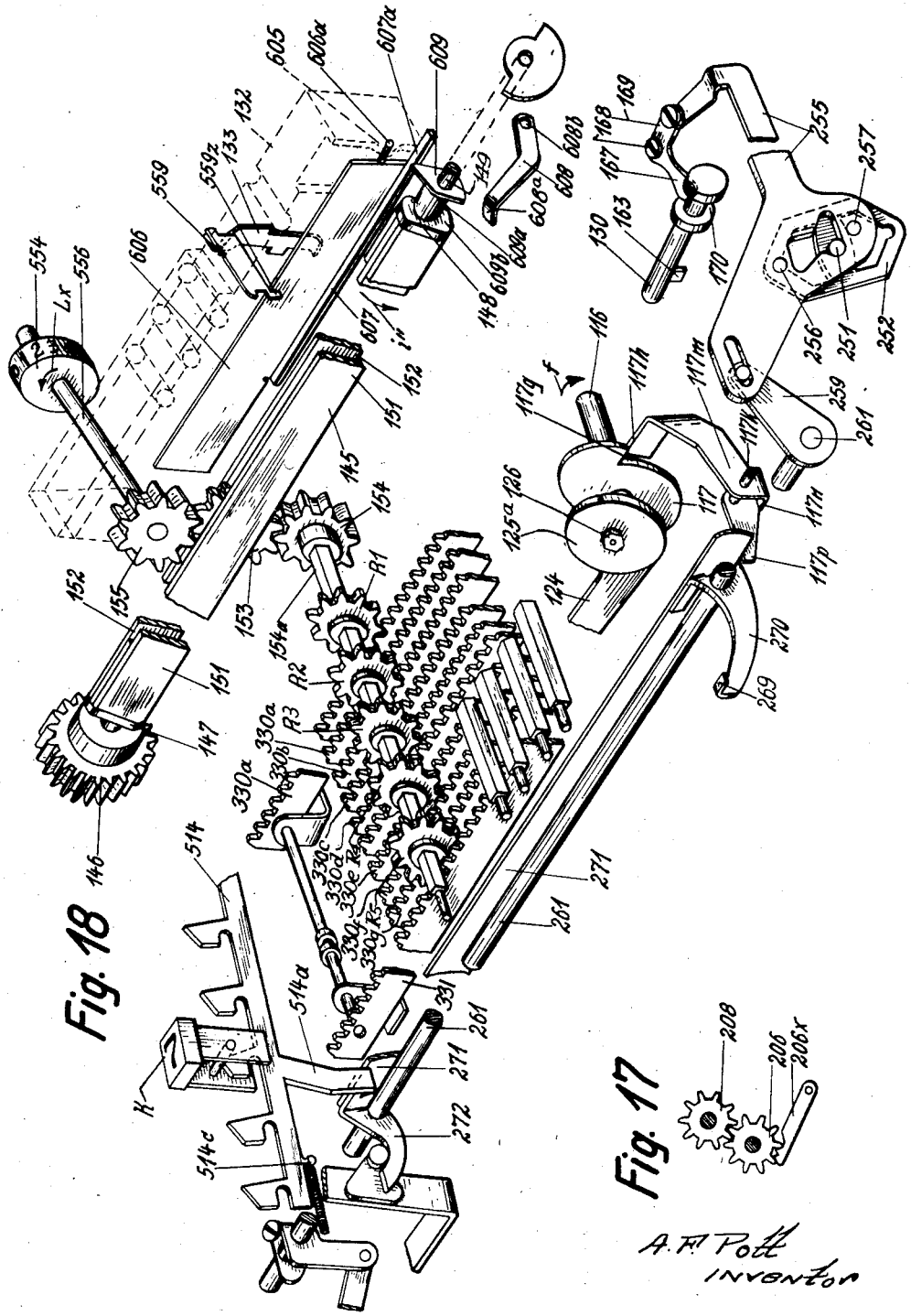

Jan. 10, 1939.　　　　　　A. F. POTT　　　　　　2,143,741
SHIFT DEVICE FOR CALCULATING MACHINES
Filed Sept. 23, 1931　　　11 Sheets-Sheet 11
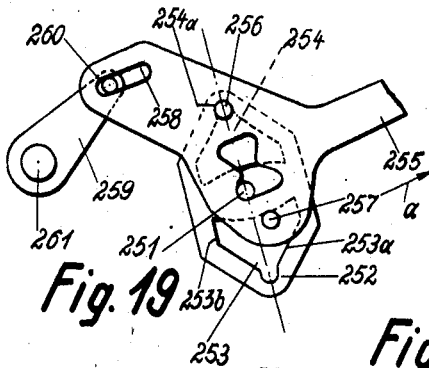
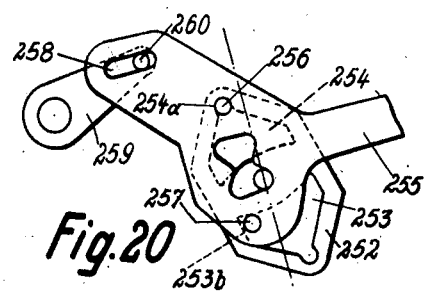
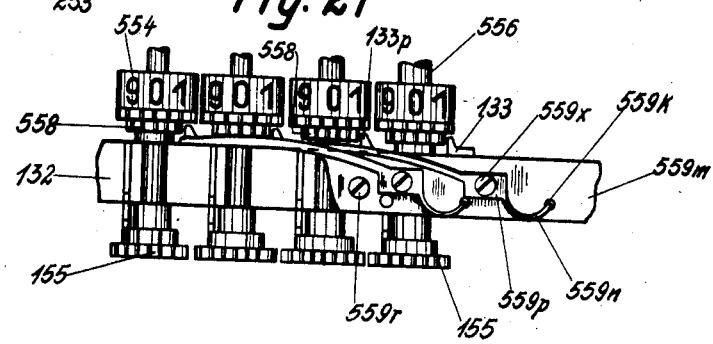
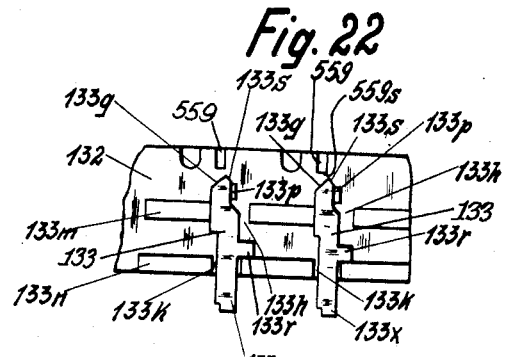
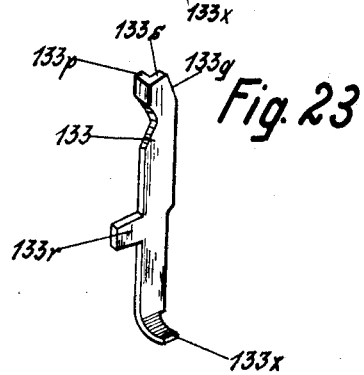

Patented Jan. 10, 1939

2,143,741

UNITED STATES PATENT OFFICE 2,143,741

SHIFT DEVICE FOR CALCULATING MACHINES

August Friedrich Pott, Zella-Mehlis, Germany, assignor to Mercedes Buromaschinen-Werke Aktiengesellschaft, Benshausen, Germany Application September 23, 1931, Serial No. 564,643
In Germany October 2, 1930

5 Claims. (Cl. 235—63)

The invention relates to a controlling device for calculating machines.

The primary object of my invention is to equip a calculating machine of this type for the performance of addition and subtraction and to provide efficient controls of simplified construction for conditioning the machine for operation as above specified.

Another object is to equip a calculating machine with a control mechanism, by means of which either of the addition and subtraction keys are controlled to release the main driving shaft for one rotation only regardless of whether the keys are held depressed or not, or by means of which the main driving shaft is maintained in rotation as long as the keys are held depressed.

Other and subordinate objects are also comprised in my invention all of which together with the exact nature of my improvements will be readily understood when the following description and claims are read with reference to the drawings accompanying and forming part of this specification.

In the drawings, one form of construction according to the invention is illustrated by way of example as applied to a Mercedes-Euclid-Calculating machine as described in Patent No. 1,011,617.

Figure 6a shows a front view of the tens carrying shaft for the revolution counter viewed in the direction of the arrow *a* in Figure 2.

Figure 6b shows the development of the periphery of the tens carrying shaft according to Figure 6a.

Figure 6c shows a plan of the numeral wheels of the revolution counter on an enlarged scale for the purpose of better illustration of the individual mechanisms.

Figure 6d shows a detail of the arrangement according to Figure 6a likewise on an enlarged scale.

Figure 7 shows a draw-key clutch for the change gear of the tens carrying shaft of the revolution counter, in which the different parts for the sake of clearness are separated out of one another.

Figure 7a shows a section through the change gear of the revolution counter on an enlarged scale.

Figure 8 shows a plan of the change gear for the tens-carrying shaft of the revolution counter, in which the shafts of the wheels for the sake of clearness are represented in substantially one plane.

Figure 9 shows a perspective view of the main drive shaft, with the clutch for the value entering mechanism and the carriage clutch viewed in the direction of the arrow *b* in Figure 3, with the parts separated out from one another.

Figure 10 is a view in side elevation of one of said carriage shift clutches.

Figure 11 is a plan view of clutch mechanism operatively related to the value entering mechanism of the machine for effecting the entry in the accumulator of values set up in the keyboard, together with the tens carrying shaft for the latter and driving parts for said shaft.

Figure 12 shows a partial side elevation according to Figure 11.

Figure 13 shows a perspective view of the machine taken from the front right-hand side of the mechanisms controlled by the addition and subtraction keys together with the motor contact and a part of the driving motor, in which the parts for the sake of clearness are represented separated out of one another.

Figure 15 shows a view of a section through the carriage along the line 15—15 in Figure 1, viewed in the direction of the arrows.

Figure 16 shows a section through the carriage along the line 16—16 in Figure 1 viewed in the direction of the arrows.

Figure 17 shows a detail view of overthrow preventing means for the revolutions counter.

Figure 18 is a perspective view of key locking mechanism value entering mechanism, clutch mechanism for effecting operation of the value entering mechanism to enter values in the accumulator and the locking rail for the tens carrying preparatory member.

Figures 19 and 20 show different positions of the control lever for the draw key clutch of the change gear for the revolution counter and show:

Figure 19 the position in the normal addition operation.

Figure 20 the position in the normal subtraction operation.

Figure 21 shows a part plan of the tens-carrying parts, viewed in the direction of the arrow P in Figure 15, with partly exposed preparation members and numeral wheel shafts.

Figure 22 shows a part of the tens carrying members with their guides and without their cover part, viewed in the direction of the arrow R in Figure 15.

Figure 23 shows a tens carrying member in perspective view.

General description

Figure 1:
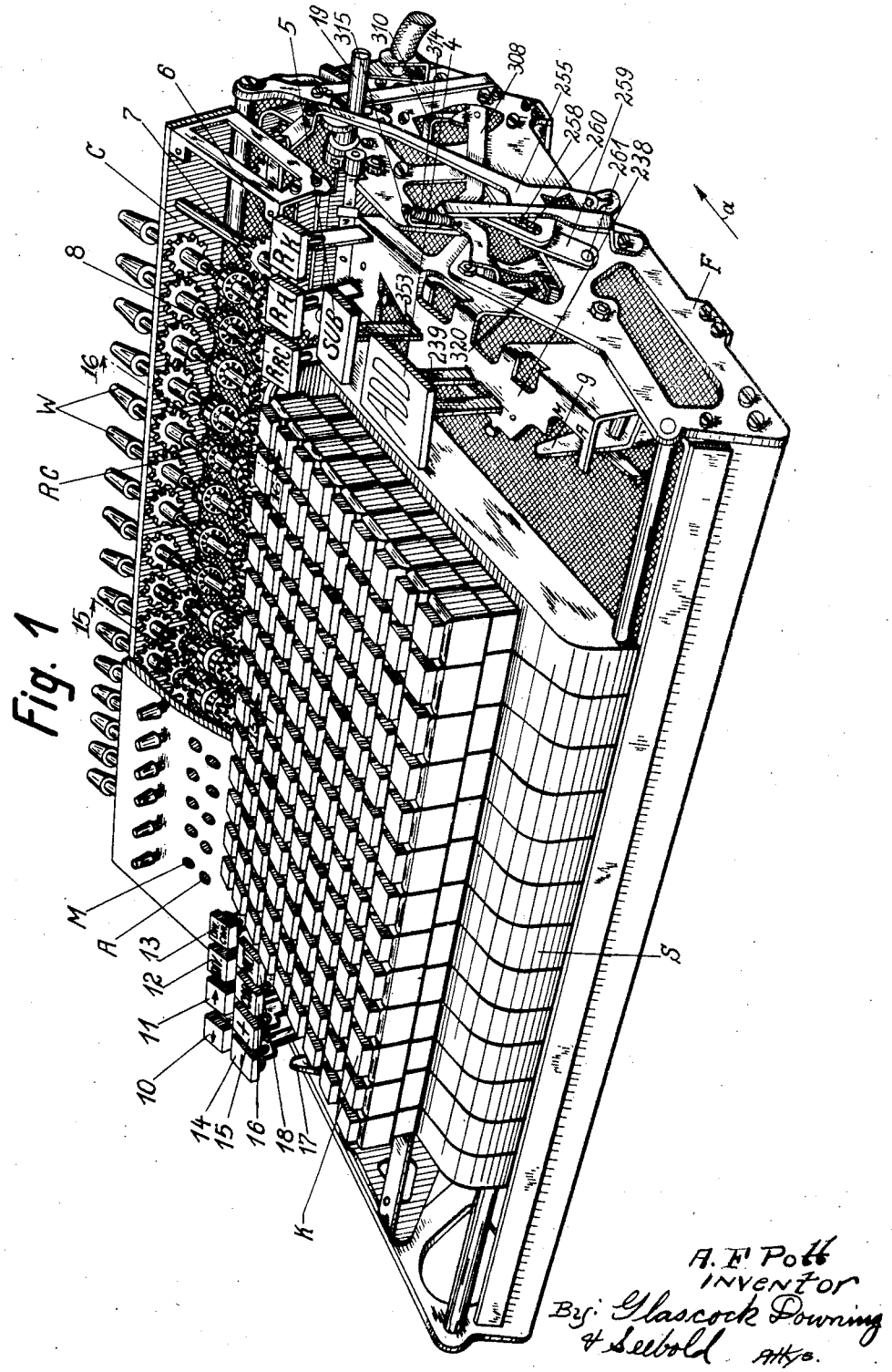
Figure 1 shows a front view in perspective of the machine in which for the sake of clearness the cover plate of the register carriage is partly removed.
Figure 2:
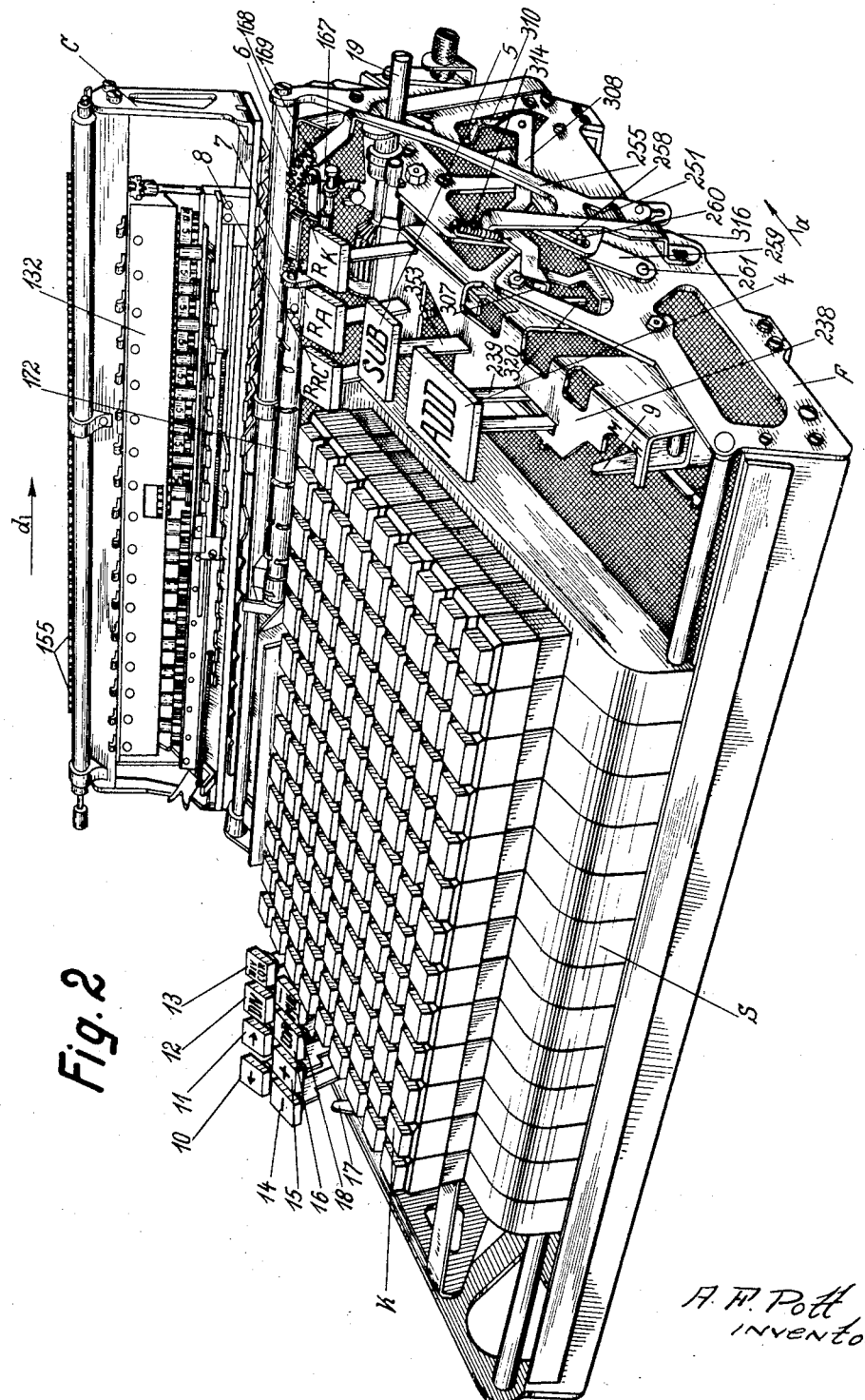
Figure 2 shows a front elevation in perspective of the machine according to Figure 1, the register carriage being, however, turned upwards rearwards.
Figure 3:
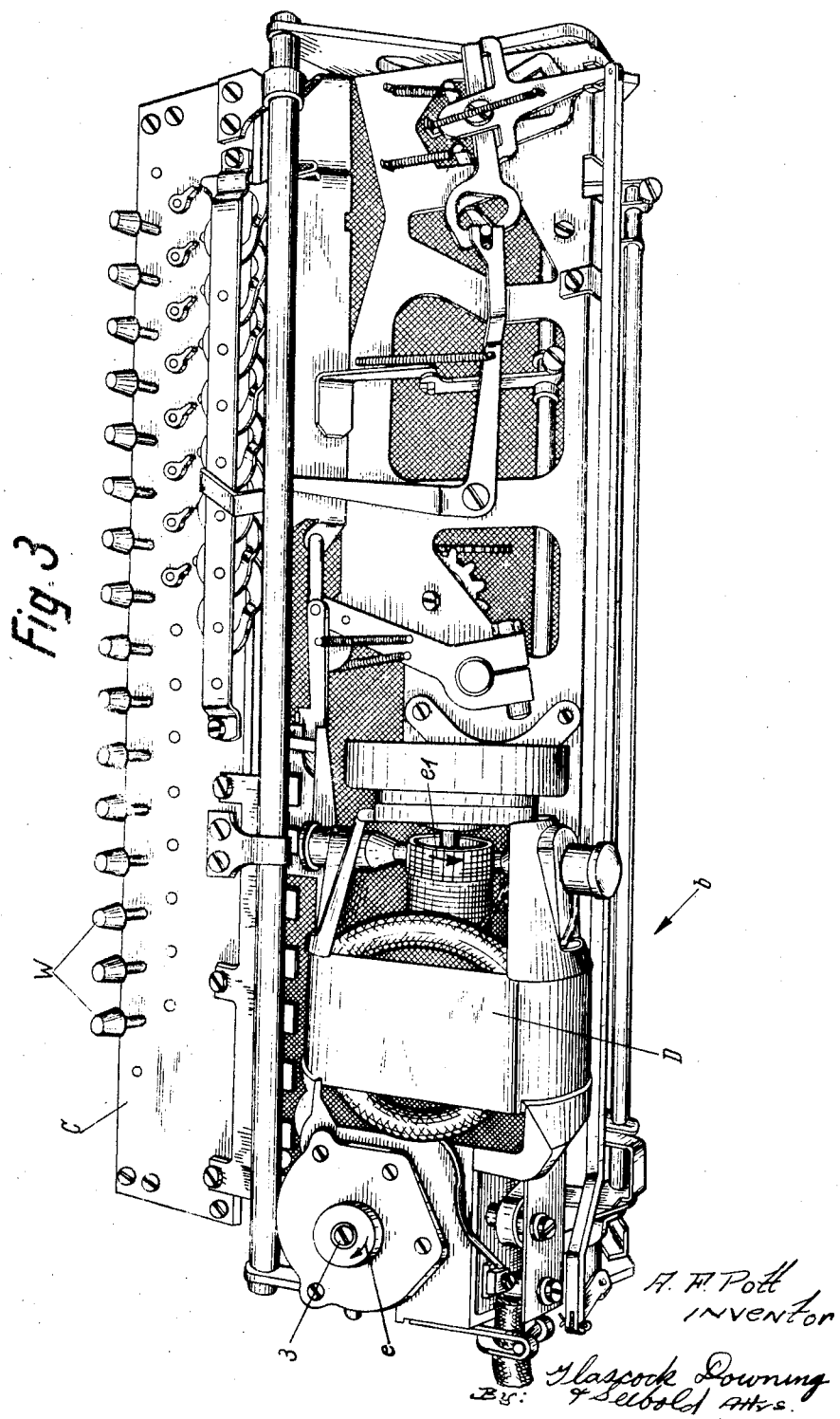
Figure 3 shows a rear view in perspective of the machine in which the rear cover plate is removed.

The Mercedes Euclid Calculating machine, as is well known, includes a setting up mechanism S. Figs. 1 and 2, a denominationally movable carriage C, a frame F and a driving motor D Fig. 3.

Above the setting up mechanism S, the keyboard K is arranged.

The motor D (Figures 3 and 13) is removably attached on the rear side of the machine. The rotations of the motor D revolving in the direction of the arrow e1 are transferred through a worm 1, (Figure 13) and a worm wheel 2, to a main drive shaft 3 (Figures 3 to 6 and 9). The main drive shaft 3 is thus rotated in the direction of the arrow e (Figures 3, 4 to 6, 9 and 13).

On the right hand side of the machine, (Figures 1, 2, 13) an addition key 4 is disposed, a subtraction key 5, a keyboard resetting key 6, which is indicated by $R_K$, an accumulator resetting key 7 which is indicated by $R_A$, a revolution counter resetting key 8, which is indicated with $R_{RC}$ and a lever 9, by means of which either of the addition and subtraction keys 4 and 5 is controlled to release the main drive shaft 3 for one rotation only regardless of whether the keys are held depressed or not (position A, Figure 1 of the lever 9) or by means of which the main driving shaft is maintained in rotation as long as the keys are held depressed (position M, Figure 1 of the lever 9).

On the left hand side of the machine the key 10 for shifting the carriage to the left and the key 11 for shifting it to the right, are disposed, a division key 12 for controlling division processes, a division correction key 13 for controlling correction of division processes, a minus multiplication key 14 and a plus multiplication key 15, respectively for operating the accumulator A and also the revolution counter RC, subtractively and additively, respectively, a correction key 16 for controlling the engagement or reversing the calculating sense of the revolution counter RC, a multiplication lever 17, for automatically performing the kind of multiplication, a key 18 operated prior to the lever 17 for performing automatically multiplication and operating the accumulator A and the revolution counter RC subtractively and a rotatable knob (not shown) arranged on the right hand side of the shaft 19 (Figs. 1, 2 and 11) adapted to be replaced by a hand crank for operating the machine in case of failure of the motor.

The main drive shaft 3 (Figures 4, 5, 6, 9 and 13) is as already mentioned driven in the direction of the arrow e by the worm wheel 2 which engages with the worm 1. On the main drive shaft 3 a cam 20 (Figures 4, 5) formed with a conically extending circumference, is non-rotatably mounted, which cam acts on an arm 21 (Figure 13) of a two-armed contact lever 22. The arm 21 in its rest position lies on the conical circumference 23 of the cam 20, and is held in this position by means of a spring 295b attached at one end to a lug 21a of the arm 21, of the lever 22, and at its other end to a nose 295a of a lever 295.

Further, a toothed wheel 24 (Figures 4, 5 and 9) and a clutch housing 25 for the carriage shift clutch, rigidly inter-connected with the toothed wheel, are rotatably mounted on the main driveshaft 3. Within the clutch housing 25 a cam 26 is pinned to said shaft 3, which rests with its side 27 against the inner wall of the housing 25. On a segment-like projection 28 (Figures 9 and 10) of the clutch housing 25, a ring 33 is fixed by means of screws 29 and 30, (Figures 4 and 5) at the points 31 and 32 (Figure 9), which ring is provided with a sufficiently large bore 34, so that the cam 26 rigidly mounted on the main drive shaft 3 can freely rotate therein. Between the clutch housing 25 and the ring 33, a trip pawl 37 is swingably mounted by means of a pin 37a in the hole 35 of the housing 25 and in the hole 36 of the ring 33. The trip pawl 37 is by means of a spring 40 acted on in the direction of the arrow e, the spring at one of its ends being attached to a nose 38 of the trip pawl 37 and at its other end to a pin 39 fixed to the inner side of the housing 25. A nose 41 of the trip pawl 37 abuts on a face 42 (Figure 4) of a clutch tripping dog 43. On the circumference of the projection 28 of the clutch housing 25, a cam 25a is provided.

On the trip pawl 37, a coupling nose 44 is further arranged, which co-acts with a nose 45 of the cam 26. In order to hold the coupling nose 44 out of engagement with the nose 45 of the cam 26, the housing 25 is provided on its outer circumference with two grooves 46 and 47, in which a pawl 48 engages, which pawl at its other end is constructed of fork shape, and this fork shaped constructed part is swingably arranged in a circumferential groove of a shaft 49. By means of a spring 50, which at one end is attached to a nose 51 of the pawl 48 and at its other end is attached to a shaft 50a, mounted in bearings in the machine frame, the pawl 48 is acted on in the anti-clockwise direction (see Figure 10). If the pawl 48 engages with the groove 47, of the housing 25, the same is held in its rest position as represented in Figure 10.

Further, on the shaft 3, the clutch housing 52 (Figures 4, 5, 9 and 13) is fixed, which likewise has a segment-like projection 53. The clutch housing 52 is clamped by means of jaws 54 provided on it and both of the screws 55 to a hub 57, provided on a gear 56, whereby the clutch housing 52 is rigidly connected to the gear 56 and in common with the same is rotatable on the main drive shaft 3. On the segment-like projection 53 of the clutch housing 52, a ring 58 is fastened by means of the screws 59 and 60 (Figure 4) which engage with the holes 61. This ring 58 has a bore 62, which is chosen so large that the cam 26 can freely rotate in it. The cam 26 rests with its side 63 against the inner wall of the clutch housing 52.

Between the clutch housing 52 and the ring 58, a trip pawl 65 is arranged in a hole 64 of the same and in a hole not represented in the clutch housing 52, the pawl being swingably mounted by means of a pin 66. This trip pawl 65 is acted on in the direction of the arrow $e$ by means of a spring 69, which is attached to the nose 67 of the trip pawl 65 and to a pin 68 of the housing 52. A nose 70 of the trip pawl 65 abuts likewise on the face 42 (Figures 4 and 13) of the clutch tripping dog 43, whilst a nose 71 of the trip pawl 65 may engage with the cam 26. In order to hold the nose 71 out of engagement with the cam 26 grooves 72 and 73 are formed in the clutch housing 52. With the grooves 72 and 73 a pawl 74 may engage which at its other end is of fork shaped construction, and this fork shaped end is swingably arranged in a ring groove 75 of the shaft 49. By means of a spring 76, which engages with a nose 77 of the pawl 74, the latter is acted on in a clockwise direction. If the pawl 74 engages with the groove 72 of the clutch housing 52, the latter is situated in its rest position.

The gear 56, which is connected with the clutch housing 52, engages with a gear 78 (Figures 4 and 11) on which a bevel gear 79 is formed.

The main drive shaft 3 is rotatably mounted in bearings in the rear wall 80 (Figure 4) and in a hub 81 (Figure 4) of a plate 82, fixed to the machine frame.

Perpendicular over and parallel to the main drive shaft 3, (Figure 4) the driving shaft 116 for the value entering mechanism (Figures 4 and 11) is rotatably mounted in bearings in the machine frame. The gear 78 fixed on the shaft 116 and the bevel gear 79 formed on the gear, as well as the shaft 116, obtain their drive from the motor D through the parts 1, 2 (Figure 13) the clutch of the value entering mechanism 26, 65 (Figure 9) and the toothed wheel 56, as already described, and rotate them in the direction of the arrow $f$ indicated in Figures 6 and 11.

On the shaft 116, a crank disc 117 (Figures 4, 6, 13 and 18) is rigidly mounted. On this disc a crank pin 118 is provided, on which an adjustable connecting bearing is arranged consisting of a disc 120 provided with a suitable number of grooves 19. On the disc 120 and on its side which is remote from the disc 117 a lateral cone 121 is provided, which serves as the inner ball bearing running ring. The disc 120 and the cone 121 are provided with a hole corresponding to the diameter of the crank pin 118, and arranged eccentrically to the cone 121. On the disc-like crank arm 117, there is riveted a pin 122 which engages with a groove 119 of the disc 120 and thereby prevents an automatic distortion of the ball bearing running ring 120, 121. Between the conical part 121 of the ball bearing running ring 120, 121 and the cylindrical inner running surface 123 of the connecting rod head 125 of the connecting rod 124, the balls which are not illustrated are inserted. These are prevented from falling out by means of a cover disc 125a, which by a nut 126, is pressed against the front side of the cone 121. By means also of the cover disc 125a, the connecting rod head of the connecting rod 124 is held in position. The connecting rod 124 is interconnected with the proportional lever which is described in U. S. Patent 1,011,617 and indicated there by the reference 1 and which drives the system of differentiating movable racks 330 to 330g, 331 (Figs. 13, 18) partly represented in Figure 18 and comprising the value entering mechanism of the machine.

The crank disc 117, (Figures 13 and 18), is provided with a recess 117g, into which projects a right angled bent lug 117h, of a lever 117m, swingable on the machine frame on a pin 117k.

The lever 117m is rigidly connected by means of a bridge 117n with the lever 117p, which is likewise swingably mounted on the pin 117k. The lever 117p rests underneath a key locking bar which will be later described in a more detailed manner.

The bevel gear 79 (Figures 4 and 11) formed on the gear 78, engages with a bevel gear 127, rigidly mounted on the tens carrying shaft 19, of the accumulator A. Further, on said shaft 19 to the left-hand side of the bevel gear 127, a gear 128 is rigidly mounted, which engages with a gear 129 (Figures 4, 6, 7 and 8) the gear 129 being carried by means of a sleeve by the draw key 130 (Figure 7).

The tens carying shaft 19, (Figures 11 and 12) carries eccentrics 131 which act on tens carrying member 133 (Figs. 15, 16, 18, 22 and 23) of the accumulator A displaceable in a beam 132. On the left-hand side of the tens-carrying shaft 19 (Figures 11 and 12) a pin gear 134 is rigidly mounted. The same consists of two discs 135 and 136 between which pins 137 and a locking piece 138 are inserted. The pins 137 and the locking piece 138 act on a two part Maltese cross 139, which is rotatably-mounted on the shaft 140, mounted in bearings in the machine frame. With the Maltese cross 139, a gear 141 is rigidly connected, and engages with an intermediate gear 143 rotatable on a shaft 142. The intermediate gear 143 engages with a gear 146, fixed to a pin 144 of a coupling gear frame 145. Said frame 145 consists of two end pieces of which the left-hand end piece 147 is represented in Figures 11 and 18. The right-hand end piece 148 is indicated in Figure 18 and is likewise provided with a pin 149, which is mounted in a bearing in a part 150 fixed in the machine frame. Both of the end pieces are inter-connected by means of bars 151 and 152 between which the clutch wheels 153 are rotatably mounted on pins. Longitudinally of the frame 145 a locking bar, not shown, is provided, which with teeth engages in the tooth spaces of the coupling gears 153, and in this manner prevents a rotation of the same with the gears 154 and 155 (Figures 15 and 18) whilst in their uncoupled positions. The locking bar is fully disclosed in my Patent No. 1,935,858, filed April 6, 1931, and is there designated by reference numeral 217.

Figure 4:
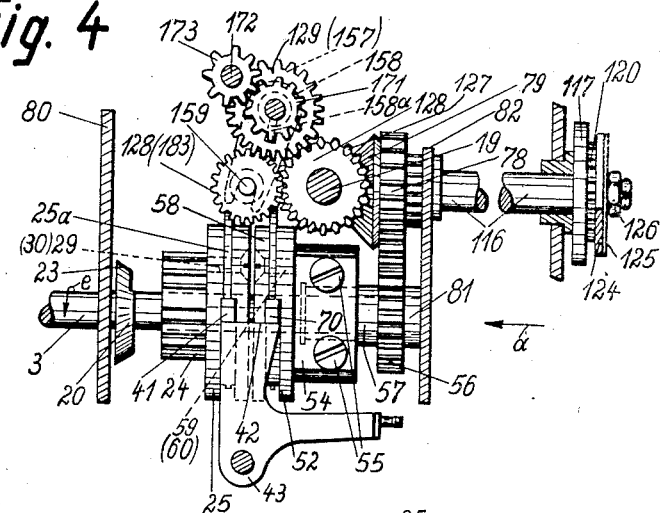
Figure 4 shows a view of the main drive shaft with the clutch for the value entering mechanism and the carriage shift clutch, viewed in the direction of the arrow *d* shown in Figure 2.
Figure 5:
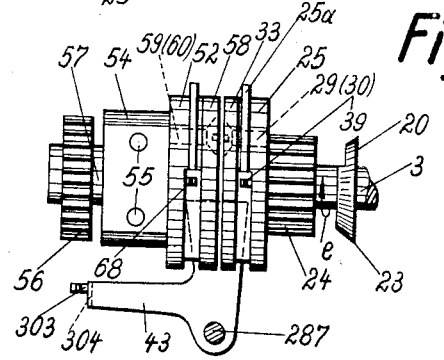
Figure 5 shows a partial view of Figure 4 viewed however, in the opposite direction to the arrow *d* in Figure 2.

The gear 128 (Figures 4, 8 and 11) engages with the above mentioned gear 129 (Figures 7 and 8), loosely and rotatably on a draw key sleeve 156 (Figures 7 and 7a) in which gear 129 a groove 160 is formed and of which the hub 129a is provided with an enlarged bore corresponding to the groove 160. Further on the draw key sleeve 156 a second gear 157 is loosely and rotatably mounted, which is provided with an enlarged bore 161 corresponding to the groove 160 of the gear 129 and in the hub 157a of which a groove 161 is formed. Between the two gears 129 and 157 a disc 158 (Figures 4 and 7) constructed as a fork, is arranged, which disc is provided with a groove 158a and which with its fork-like end embraces the shaft 159 (Figure 4). By means of this arrangement, it is possible to couple the toothed wheel 171 sometimes with the gear 129, by means of the draw key 130, of which the part 163 slides in the groove 162 of the draw key sleeve 156, and at other times with the gear 157. If the draw key is situated in the middle position indicated in Figure 7a, the gears 129 and 157 can, without influencing the gear 171, rotate on the sleeve 156.

The draw key sleeve 156 is rotatably mounted on the right in a box 164 (Figure 7) and on the left by means of a projection 165, in the bearing piece 166.

The arm 167 (Figures 2 and 7) of the draw key setting belt crank 169, swingably mounted on the machine frame by means of a pin 168, engages in a ring groove 170, of the draw key 130, and displaces this axially, so that the part 163 of the draw key sometimes may come into the working position in relation to the gear 129 and sometimes into the working position in relation to the gear 157. On the left adjacent to the gear 129, the toothed wheel 171 is provided on the draw key sleeve 156, which gear engages with a gear 173 rigidly mounted on the tens carrying shaft 172 of the revolution counter RC. The tens carrying shaft 172 (Figure 6a) is at its right and left-hand ends rotatably mounted on the machine frame by means of trunnions 174.

The shaft 172 is maintained in its normal position by means of a pin 175 (Figure 6a). The pin 175 is acted on upwards by means of a spring 176, which at one end rests against the shoulder 177 of the pin 175, and at its other end rests against the bearing part 178. The pin 175 is guided in a bearing part 179, and engages with a recess 180 of the tens carrying shaft 172.

Further with the gear 128 (Figure 8) a gear 181 loosely and rotatably mounted on a shaft 159 (Figure 4) engages the gear 181, being rigidly connected by means of a sleeve 182 with a gear 183, represented in Figure 8. The latter gear engages further with the already mentioned toothed wheel 157.

On the revolution counter driving and tens carrying shaft 172 (Figures 6a and 6b) transport pieces 184 to 184j, are provided. The transport piece 184, situated furthest to the right, does not act immediately as such, but both of its ends are provided with spring operated slides 185 and 186, of which in the following only the slide 186 will be described in detail. In Figure 6d the slide 186 is represented with the shaft 172 in section on an enlarged scale. This slide 186, which on its lower part 187 is of cylindrical form, is arranged so as to be vertically displaceable in a hole 188 of the shaft 172. It is provided with a small lug 189, which is notched at 190, and lies in a groove 191 (Figure 6b) in front of the transport piece 184. The transport piece 184 is broadened by means of lug 189 (Figure 6b) so that the inclined face 184A formed by the lug 189, approximately is twice as broad as the transport piece 184. In a second hole 193 in the shaft 172, a spring 195 is suspended by means of a small bow 194, the spring at its other end, resting in a stop 196 of a lever 197. This is provided with a small pin 198, which engages in a proportionately large hole 199, so that the lever 197 can execute swinging movements against the action of the spring 195 around the pin 198. The lever 197 lies in a groove 200 of the shaft 172, and engages with its end 201, in a recess 202 of the slide 186 and thereby holds this in its normal position, which is determined by means of the spring 195 and the contact of the lever 197 on the bottom of the groove 203. The inclined edge 184A (Figure 6b) of the slide 186, is so broad that it may rotate the gear or pin gear 204 (Figures 6a and 16) which lies opposite to it at the moment, for operating the numeral wheels 205 (Figures 1, 6a, 6c and 16) for a whole division or a whole unit in the direction of the arrow m, in an eventual rotation of the shaft 172 in the direction of the arrow j (Figure 6a). In the rotation of the shaft 172 in the direction of the arrow j, the numeral wheels 205 of the revolution counter RC are operated in the additive sense. For this reason all the inclined surfaces of the transport pieces 184 to 184d and 184h to 184j (Figure 6b) are provided with the index A (addition) whilst those inclined surfaces of the transport pieces 184 to 184d and 184e to 184g, which in the rotation of the shaft 172 in the opposite direction to the arrow j, rotate the numeral wheels 205 in the subtractive sense, are indicated by the index S (subtraction).

The slide 185 is in its construction exactly similar to the slide 186. In the rotation of the shaft 172 in the opposite direction to the arrow j the slide 185 acts in the opposite direction to the slide 186 on the star gears 204, i. e. the numeral wheels 205 are through it, rotated through one unit in the subtractive sense also in opposite direction to arrow m.

The right star wheel 204a (Figure 6c) in each rotation of the shaft 172 rotates also the right numeral wheel 205, through one unit (Figures 6a and 6c) by means of the gear 206 (Figure 16) which through the sleeve 207 is rigidly connected with the star wheel 204, and engages with the gear 208. By means of a double toothed pawl 206x, (Figure 17) the gear 206 is held in its rest position. In the transmission from "9" to "0" or from "0" to "9" the right numeral wheel 205 rotates the numeral wheel 205a of the next higher place through half a unit by means of the nose 209 (Figures 6a, 6c and 16) rigidly fixed to the star gear 204a, and engaging with the toothed wheel 208′, whilst the rotation through the remaining half unit is effected by the obtaining transport piece 184a to 184j in a manner to be hereinafter described in more detail.

As the star gears 204 with the numeral wheels 205 are mounted in the displaceable carriage C the shaft 172 on the other hand is mounted in the machine frame, the slides 185 and 186 naturally only then act on the star gear 204a lying furthest to the right if the carriage C is situated in its extreme left position, i. e. in its rest position, as is the case in addition and subtraction. If the carriage C on the other hand e. g. is displaced one place to the right, the slides 185 and 186 co-act obviously with the second star gear 204b (Figures 6a and 6c) from the right.

The displacement of the carriage C is only possible in the rest position of the shaft 172 which is determined by the stop pin 175. In this position the shaft 172 is disposed as indicated by the line x1 in Figure 6b opposite to the star gears 204 so that the star wheels on a displacement of the carriage C can move un-impeded through between the transport pieces.

On the right hand side of the machine frame, a guide plate 238 (Figures 1 and 2) is fastened, in the right angled bent horizontal limb of which the key stem 239 is provided, so as to be vertically displaceable. To the same the addition key 4 is fastened by means of screws not shown. The downwardly directed end of the key stem 239 is of fork-like construction (Figure 13) and embraces with its forked part a pin 239a, mounted on the machine frame, so as to form a guide for the key stem 239. On one fork arm, a nose 240 is provided with which one end of a spring 241 engages, the other end of the spring being attached to the guide plate 238, whereby the key stem 239 is maintained in its rest position, which is determined by the face 242 of a lug 243, formed on the key stem 239 striking against the under edge of the guide plate 238. On this lug 243 is, further, a pin 244 riveted, which acts on a face 245 of a shift lever 246 for shifting the reverse gearing 157, 129, 171 (Figs. 7, 8) for reversing the direction of the tens carrying shaft 172 (Figures 6a and 8) of the revolution counter RC, the shift lever 246 being disposed close to the left hand side of the key stem 239. The shift lever 246 is rotatably mounted on a shaft 247, fixed in the machine frame, and is provided with a face 246a, the aim of which will be described later. The shift lever 246 is of fork-shaped construction at its rearwardly directed part, and embraces with the same a pin 249, provided on a lever 248. The lever 248 is constructed of U-shape at its lower end and is rigidly clamped to a shaft 251 by means of a screw 250.

On the shaft 251 (Figures 13, 19 and 20), a counter state control crank 252 is fixed on the right-hand outer side of the machine, which lever is provided with two triangular recesses 253 and 254 (Figures 19 and 20). With the recess 254 a pin 256, arranged on counter state control bar 255, constructed according to Figures 19 and 20, normally engages while with the recess 253 a pin 257 fastened to said bar 255 may engage.

In the counter state control bar 255 an elongated hole 258 is provided, into which projects a pin 260, riveted to a lever 259 (Figures 19 and 20). The lever 259 is mounted rigidly on a rotatably mounted shaft 261 (Figures 1, 2 and 18). The free rearwardly directed end of said bar 255 (Figures 1, 2 and 7) is jointed to the swingable draw key setting bell crank 169 hereinbefore described, which controls the draw key 130, 163 of the change gear for the tens carrying shaft 172 of the revolution counter RC.

On the lug 243 (Figure 13) of the key stem 239, a pin 262 is further arranged, which acts on a face 263 of the lever 265, disposed immediately to the right of the key stem 239, and swingable on a bearing pin 264, in the clockwise direction. By means of a spring 267, which at one end engages with a notch 266 of the lever 265, and at its other end is attached to a pin, not shown, arranged on the machine frame, the lever 265 is held in its normal position as represented in Figure 13, which is determined by impact of the face 263 upwards against the pin 262 of the key stem arm 243. A lug 268 provided on the lever 265, may act on the lug 269 of a lever 270 (Figure 13) mounted so as to be loosely rotatable on the shaft 261.

To the fork shaped and right angled bent part of the lever 270 (Figure 13) the key locking bar 271 (Figures 13 and 18) is fixed. The latter is fastened on the left-hand side of the machine to a similarly forked and right angled bent part of a lever 272 (Figure 18). A pin 273 riveted to the rearwardly directed part of the lever 265 (Figure 13) projects into a right angled aperture 274, of a slide 275. The latter in its position for multiplication calculations represented in Figure 13, rests with its lug 276 on the already mentioned pin 239a, whereby the pin 273 which in the position represented in Figure 13, engages with the aperture 274 of the slide 275, and the lever 265 is so acted on without the slide 275, that it can swing round the pin 264 in the clockwise direction. The slide 275 is at its forwardly directed end jointed to a U-shaped lever 277, by means of a pin 278. The pin 278 is fixed at one side into a limb 9, formed as a grip, and on the other side in a limb 280 of the U-formed lever 277. This is swingably mounted round the already mentioned pin 264. By means of a leaf spring 281, fastened to the lower side of the guide plate 238 and V-shaped at its free end, the lever 277 and the slide 275 are held in the position in which they are set. These positions, corresponding to addition and multiplication operation respectively, are indicated on the portion from which the cover plate is removed with M and A respectively (Figures 1 and 2). In the one setting position of the parts 9, 275 according to the indication A the rearwardly directed end 274a of the slide 275, is acted on by the head 125 of the connecting rod 124, which is linked to the crank disc 117, the head 125 in the rotation of the crank disc 117, so far displaces the slide 275 and therefore the lever 265, transversely to their own oscillation plane that the edge 263 of the lever 265 is disengaged from the pin 262 of the key stem 239.

For this purpose the bore of the bearing of the lever 265 relatively to the diameter of the bearing pin 264, is chosen so great that the lever 265 is able to execute such a lateral movement. The direction of pull of the spring 267 is so chosen that the lever 265 with its horizontal edge 263, normally is held in contact with the underside of the pin 262 and against the lug 243. The lug 282 provided on the slide 275 sets on a part to be hereinafter described.

Against the key locking bar 271, an arm 283 of a U-shaped lever rests which is swingably mounted on the shaft 247. To the downwardly directed arm 284g, a connecting rod 285 is jointed by means of a leaf spring and pin, and its other end is similarly jointed to a lever 286. By means of a spring 284a, which at one end engages with a nose 284b of the lever 284 and at its other end is attached to a pin, not shown, of the guide frame 238, the lever 284 is held in its rest position, which is determined through the impact of the face 289g, of the arm 289a, of a lever 289 on the machine frame. The lever 286 loosely swingable on the shaft 287 is rigidly connected by means of a bow 288 with the three armed lever 289 likewise swingably mounted on the shaft 287. In the rest position of the lever 284, the arm 289a, with its face 290 contacts with a roller 292 mounted on a lever 291. The lever 291 which is swingably mounted on the shaft 233 (Figures 3 and 13) is rigidly connected by means of a bridge 294, with a lever 295 likewise swingably mounted on the shaft 233. A spring 297 attached at one end to a pin 296 of the lever 291 and at its other end, to the machine frame in any suitable manner, acts on the lever 291 as well as the lever 295 in the clockwise direction round the shaft 233. Through contact of the roller 292 of the lever 291, with the face 290 of the arm 289a, of the lever 289, the normal position is determined. On the upwardly projecting right angled bent end of the lever 295, the two-armed lever 22, previously mentioned is swingably mounted. This acts with the downwardly projecting limb on a contact spring 299 fixed to the angle piece 298. On the free end of this spring a contact pin 300 is fixed, which co-acts with a contact pin 302 fastened to an angle piece 301.

The arm 289b under the pull of a spring 306, which at one of its ends is engaged with an arm 289c of the three armed lever 289, and at its other end to a pin 303 of a right angled bent lug 304 of the clutch tripping dog 43, which is fixed on the shaft 287, is maintained in fixed connection with the clutch tripping dog 43, whereby the arm 289b of the three-armed lever 280, lies on the top of the lug 304 of the clutch tripping dog 43. The other arm of said dog 43 as already described, co-acts with the clutches 25 and 52.

The key resetting device automatically operating in each rotation of the main drive shaft 3, consists of the following parts.

Figure 14:
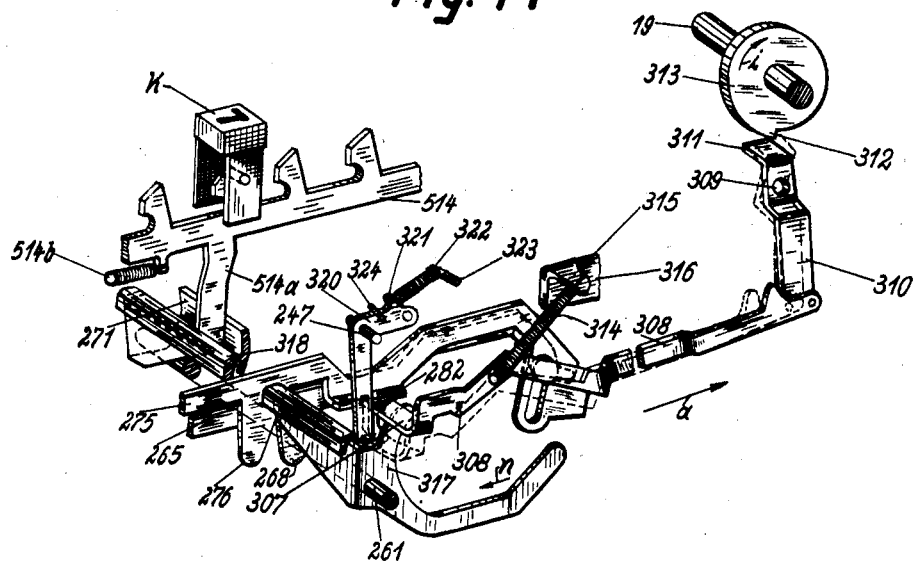
Figure 14 shows a perspective view of the resetting mechanism for the keyboard automatically controlled by the addition or subtraction key.

The lug 282 (Figures 13 and 14) provided on the slide 275 acts on a lug 307, of a connecting rod 308. This is as illustrated in Figure 14 jointed to a lever 310, swingably mounted at the point 309 on the machine frame. On the free end of the lever 310, a lug 311 is formed by bending, on which acts a nose 312, of a disc 313, rigidly mounted on the tens carrying shaft 19, Figure 11 of the accumulator. To the connecting rod 308 is attached a spring 314 which at its other end is connected to a lug 315 of a guide part 316, (Figures 1 and 2) rigidly mounted on the machine frame. The angle lug 307 on the connecting rod 308, acts on an arm 317 (Figure 14) of the key resetting bar 318, swingably mounted on the shaft 261. Further, the lug 307 of the connecting rod 308 co-acts with an angle lever 320, swingably mounted on the shaft 247 (Figure 14) and adapted to coact with the key resetting bar for automatic key resetting operation in dependence of each rotation of the main drive shaft 3. A spring 322 is attached at one of its ends to a nose 321, of the lever 320, and at its other end is attached to a pin 323, fixed to the machine frame, and so acts upon the lever 320 that it always rests against a pin 324 mounted on the machine frame.

In order to shift the racks of the value entering mechanism from addition to subtraction and vice versa, a two armed lever 325 is rigidly mounted on the shaft 251 (Figure 13) which lever, with its upwardly directed arm, engages a ring grooved sleeve 327, fixed on a pin 326, the pin 326 being guided in two bent lugs, 328 and 329 on the machine frame.

In addition, the pin 326, is coupled with the rack 330 and in subtraction, with the rack 331.

On the upwardly directed part of a subtraction stem 353 (Figure 13) vertically displaceable in the guide plate 238, (Figures 1 and 2) the key 5 is attached by means of a screw, not shown. The downwardly directed end of the key stem 353 is of fork shaped construction, and embraces with its forked part a screw, not shown, in the machine frame, so as to form a guide to the key stem 353. A spring 354, which is attached at one end to a nose 355 of the key stem 353, and at its other end is connected to the guide plate 238, holds the key stem 353 in its normal position, which is determined through the impact of the face 356 of the right angled downwardly bent part of the key stem 353, on the under edge of the guide plate 238. On the lefthand side of the lug 357, provided on the key stem 353, a pin 358 is riveted, and acts on the face 246a (Figure 13) of the shift lever 246, for shifting the reverse gearing 157, 129, 171 for reversing the direction of the tens carrying shaft 172 (Figures 6a and 8) of the revolution counter RC. On the right hand side of the lug 357 of the key stem 353, a further pin 360 is provided, which acts on the edge 265 of the already mentioned lever 265.

On the beam 132 mounted on the carriage C a flap 606, for resetting the preparing slides 559 for tens carrying and locking the same in the resetting position, is swingably mounted in the hubs 605 (in Figure 18 only the right hub 605 is visible). On said flap a ledge forming projection 607 is provided, of which the end 607a which projects to the right lies against a lug 608a of a lever 608 swingably mounted in the machine frame. The lug 608a of the lever 608, co-acts alternately with the noses 609 and 609a, which are provided on a hub 609b of the coupling wheel frame 145 carrying the coupling gears 153, and serves for the locking of the flap 606.

The preparatory members 559 are, on their upper sides, provided with notches 559g and 559h, in which a ball 559k, (Figures 15 and 21) may engage. The ball 559k is disposed in a hole of the cover bar 559m and is by the arm 559n, (Figure 21) of a spring 559p, continually acted on against the preparatory member 559, whereby this in the one or other end positions determined by the notches 559g and 559h can be blocked. In order to prevent the shafts 556 and the preparatory members 559 escaping out of their positions, the shafts 556 and the preparatory members 559 are covered with the cover bar 559m, which is fastened by means of screws 559r to the bearing beam 132. With the edge 559s, the preparatory member 559 may act on the inclined face 133g of the tens carrying member 133.

The tens carrying members 133, which may have the form illustrated in Figures 22 and 23, are guided in grooves 133h and 133k which are arranged transversely in relation to the two bars 133m and 133n arranged longitudinally on the bearing beam. The grooves 133h are somewhat wider than the tens carrying member 133 itself, so that the member 133 can be swung to the left (as seen in Fig. 18) or to the right respectively (as seen in Fig. 22) and so its nose 133p can engage with the toothed wheel 558 of the numeral wheel 554 of the next higher decimal place. Of this swinging movement consideration is also taken by means of corresponding clearance of the tens carrying members in the groove 133k.

A lug 133r limits the upward and downward strokes of the tens carrying member 133. The tens carrying members 133 are prevented from falling out by a cover bar 132x (Figure 15).

The leaf springs 559p, fastened to the cover bar 559m, by means of screws 559x, and as above mentioned with their arms 559n on the balls 559k, act with their other arms on the edge 133s of the tens carrying member 133, and hold the same in their lower vertical position as shown in Figure 22.

The tens carrying member 133, which has the form as shown in Figure 23, is in its upward movement swung to the left by the edge 559s (Figure 15) of its appertaining preparatory member 559, so that its nose 133p can engage with the toothed wheel 558 of the numeral wheel 554 of the next higher decimal place and rotate this one unit further round.

*Operation of the addition*

For the purpose of performing addition as known, first the term is set on the keyboard K (Figures 1 and 2) whereby the setting wheels indicated with R1 up to R5 (Figure 18) are brought into engagement with racks of the value entering mechanism corresponding to the individual place values of the terms.

In order now on the depression of the addition key 4, (Figure 13) to obtain in each case only one rotation, the lever 9 is first swung out of the position illustrated in Figure 13, into the position represented in Figure 1, consequently on to the mark A. With this the rod 275 jointed to the lever 9 by means of the pin 278 is displaced in the opposite direction to the arrow $a$, whereby the pin 273 of the rod 265 extends into the closed end of the slot 274g, so that in a downward movement of the rod 265, the rod 275 is also taken downwards along with it. When the setting of the lever 9 on the mark A is effected, the addition key 4 is depressed.

In the depression of the addition key 4 (Figure 13) the pin 244, riveted on the lug 243, acts on the face 245 of the shift lever 246, and swings this in the anti-clockwise direction into the position represented in Figure 13. With this the shift lever 246, of which the fork-shaped end embraces the pin 249, swings the lever 248 rigidly mounted on the shaft 251 in the clockwise direction, and therefore rotates the shaft 251. The counter state control crank 252 likewise rigidly mounted on the shaft 251 is thereby swung in the clockwise direction into the position illustrated in Figure 19, whereby the stop 254a of the recess 254 acts on the riveted pin 256 of the counter state control bar 255. With this the pin 257 of said bar 255 and the side 253a of the recess 253 move in relation to one another. The recess 253 is besides naturally kept so great that the pin 257 and the edge 253a cannot interfere with one another. The counter state control crank 252 now displaces through its swinging movement in the clockwise direction, the bar 255 in the direction of the arrow $a$ (Figures 19 and 2). This swings in turn the draw key setting belt crank 169, 167 (Figure 7) in the anti-clockwise direction round the pin 168, whereby the arm 167 of this which engages in the ring groove 170 of the draw key 130, 163, displaces the latter so far to the right that the nose 163 thereof enters into the groove 161 of the gear 157 and couples therefore the latter with the gear 171 rigidly connected with the draw key sleeve 156, whilst the gear 129 may then run idly on the draw key sleeve 156. The change gear for the revolution counter RC is also therefore shifted to addition.

In the rotation of the shaft 251 (Figure 13) in the clockwise direction, the coupling pin 326 is by means of the lever 325, displaced in the direction of the arrow $a$ whereby the rack 330 is blocked, and therefore the value entering mechanism is set for additive operation according to Figure 13.

During the coupling of the gear 157 (Figure 7) with the draw key sleeve 156 and the coupling of the rack 330, by means of the pin 326, on the depression of the addition key (Figure 13) the pin 262 riveted on the part 243, acts on the upper edge 263 of the lever 265, and swings the same against the action of the spring 267 in the clockwise direction. Since on the setting of the lever 9 for addition indicated A the rod 275 has been displaced in the opposite direction to the arrow $a$ (Fig. 13) the pin 273 of the lever 265 is in engagement with the slot 274g of the rod 275. The lever 275 is consequently also swung in the clockwise direction and of course round the pin 278, so that the part 274a, (Figure 13), reaches into the path of movement of the connecting rod head 125 of the connecting rod 124.

In said swinging of the lever 265 (Figure 13) in the clockwise direction, round the pin 264, the projection 265a, of the lever 265, is positioned before the edge 271a of the key locking bar 271, and of course, to the right of the lever 270. On the depression of the same, the projection 268 of the lug 269 of the same, the lever 270 is swung in the anti-clockwise direction round the shaft 261. In this swinging movement, also, the key locking bar 271 takes part without being prevented by the projection 265a. This locking bar remains then with a small amount of play distant from the projection 265a, and acts on the lug 283 of the lever 284, whereby this is swung in the clockwise direction round the shaft 247. With this the connecting rod 285 jointed to its downwardly directed limb is displaced in the opposite direction to the arrow $a$ and consequently the lever 286 jointed to it, swings round the shaft 287 in the clockwise direction, whereby the face 290 of the arm 289a, of the three-armed lever 289 acts on the roller 292 of the lever 291 and this as well as the lever 295 connected to it by means of the bridge 294, swings against the action of the spring 297 in the anti-clockwise direction round the shaft 233, whereby the contact lever 22 is displaced in the opposite direction to the arrow $a$ and the arm 21 of the lever 22 which normally through the action of the spring 295b is brought into contact with the conical periphery 23 of the cam 20, slips off from this. The contact lever 22a can now under the action of the spring 295b, swing in the anti-clockwise direction, whereby under the action of the contact spring 299, the motor contact 300 and 302 is closed. The motor D now commences to run in the direction of the arrow $el$ and rotates the main drive shaft 3 by the worm 1 disposed on the motor shaft through the worm wheel 2, in the direction of the arrow $e$. The spring 306 engaging with arm 289c of the lever 289, swings then the coupling clutch tripping dog 43 and the shaft 287 in the direction of the arrow $el$ (Figure 4) whereby the nose 70 of the clutch 52 is released. The trip pawl 65 (Figure 9) under the action of its spring 59, is thereby operated so that its nose 71 is brought into engagement with the tooth 45, of the coupling cam 26, fixed to the main drive shaft 3, whereby the cam 26, said pawl 65 and therefore also the clutch housing 52, in which the clutch pawl 65 is mounted by means of the pin 66, are carried along in the direction of the arrow $e$. The clutch tripping dog 43, is prevented from making a backward movement by the cam 52x of the clutch housing 52, so that an eventual swinging of the clutch tripping dog 43 in the opposite direction to the arrow $el$, which could arise through accidental pressure of another operating key, is prevented. The gear 56 (Figure 4) which is in rigid connection with the coupling 52, by means of the screws 55, and the hub 57 provided on the gear 56, is thus rotated in the direction of the arrow $e$.

Figure 6:
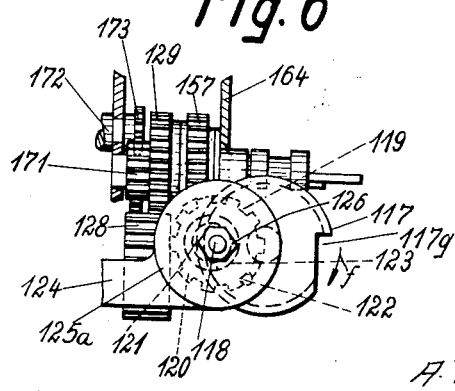
Figure 6 shows a side view of Figure 4 viewed in the direction of the arrow *a* in Figure 4.

The spur wheel 78 (Figures 4 and 11), which is disposed vertically over the gear 56, and engages with it, is thus rotated in the direction of the arrow $f$. As the bevel gear 79 formed on the gear 78, engages with the bevel gear 127, this is rotated in the direction of the arrow $i$. In this rotation, the gear 128, rigidly mounted on the shaft 19, likewise participates. This transmits the rotational movement through the gear 181 (Figures 4, 6 and 8) and through the gear 183, rigidly connected with the latter by means of the sleeve 182, to the gear 157, which, as formerly mentioned, in the depression of the addition key 4, is coupled through the draw key 130, 163 with the draw key sleeve 156, so that consequently also the gear 171 rigidly connected with this, rotates in the direction of the arrow $i$. As this in turn is in engagement with the gear 173 (Figure 6a)

fixed to the tens carrying shaft 172, so the tens carrying shaft 172 of the revolution counter RC rotates in the direction of the arrow j (Figures 2, 16 and 6a). On this the inclined face 184A (Figures 6 and 6a) of the lug 186 (Figures 6b and 6d) acts on the tooth 204y (Figure 6a) of the star wheel 204a, (Figure 6a) positioned furthest to the right in the carriage C and rotates this in the direction of the arrow k (Figure 6a) to the position of the tooth 204x, for a complete division. Immediately after this rotational movement the transport piece 184 enters into the toothed space lying opposite to it of the star gear 204a, whereby this is secured against further rotation. By means of this rotational movement of the star gear 204a, through one division, the toothed wheel 206 (Figure 6c) standing in fixed relation with the star gear likewise rotates in the direction of the arrow k, and as this is in engagement with the toothed wheel 208, fixed to the numeral wheel 205 of the revolution counter RC, so this and with it the numeral wheel 205 rotate in the arrow direction m, i. e. in the additive sense for a whole unit. As may be seen, the subtraction lug 184, 185 with its notch 185c corresponding to the notch 190 (Fig. 6d) of said lug 186, stands in the way of said shifted tooth 204y, the position of which corresponds to the position of tooth 204x (Fig. 6d). Consequently the lug 185 is pressed back against the action of its spring by the coaction of the tooth 204y with the notch 185c towards the end of the rotation of the shaft 172. A rotation of the star wheel 204x cannot thus take place in consequence of the positive guiding given by the notch 185c and the transport piece 184, of the already shifted star gear 204a.

If now the numeral wheel 205 situated furthest to the right of the revolution counter RC has arrived at the value "9" so must in the transition of the same from "9" to "0" a tens transference in the numeral wheel 205a disposed close to the left take place. This happens in the following manner.

In the change from "9" to "0" of the numeral wheel 205 disposed furthest on the right, a shift nose 209 (Figures 6c and 6a) fixed on a sleeve 207 (Figures 6c and 16) acts on the gear 208a', which is rigidly connected with the next higher numeral wheel 205a. The numeral wheel 205a has still only rotated through one half-unit and likewise the gear 208a rigidly connected with the numeral wheel 205a. As the gear 208a is in engagement with the toothed wheel 206a which is rigidly connected with the star gear 204b, belonging to the next higher place, so naturally this is also rotated through one half-unit. In this position set on the half division, the star gear 204b is held through engagement of a double tooth pawl 206x (Figure 17) in the tooth space of the gear 206. In this rotation of the star gear 204b for half a unit, the pin 204c of the same enters the rotational part of the inclined surface 184aA (Figure 6b) of the transport piece 184a, whereby in the rotation of the tens carrying shaft 172, the star gear 204b as well as the numeral wheel 205a, are shifted round through the still lacking half unit. In a similar manner, naturally, the tens transfer to each next higher numeral wheel is also effected.

After, therefore, the drive of the revolution counter RC on the depression of the addition key 4 has been described the drive of the value entering mechanism in U. S. Patent 1,011,617 will be shortly explained. As above mentioned, on the depression of the addition key 4, the shaft 116 (Figures 4, 11 and 13) rotates in the direction of the arrow f, whereby through the crank disc 117, which is fixed to the shaft 116, and the connecting rod 124 jointed to the crank disc and indicated by 85 in U. S. Patent 1,011,617 the proportional lever which is not illustrated here, is swung out, which moves the system of differentially movable racks (indicated in Figure 18).

The movements of the racks of the value entering mechanism are then through the wheels R1 to R5 brought into engagement with the racks by the value keys K transmitted to the shafts 154a, whereby also the gears 154 fixed on these shafts corresponding to the set value rotate forwards and backwards. In order to transfer only the forward rotation to the gears 155 of the numeral wheel shaft 556 and thus to the numeral wheels 554 of the accumulator A a coupling is introduced, between the gears 154 and the gears 155, of which the operation will be shortly explained in the following.

On the left hand side of the machine, on the tens carrying shaft 19 (Figure 11) the pin gear 134 is rigidly mounted, which corresponding to the rotation of said shaft 19 is likewise rotated in the direction of the arrow i. The pin gear 134 now rotates the Maltese cross 139 by means of the pins 137 (Figure 12) so far in the direction of the arrow i' until the locking piece 138 of the pin gear 134 acts on the locking curve 139a of the Maltese cross 139. In the rotation the gear 141 formed on the Maltese cross 139, the gear 143 engaging with the latter and the gear 146 standing in engagement with the gear 143 also take part. Then the coupling gears frame 145 carrying the coupling gears 153 (Figures 11 and 18) rigidly connected with the gear 146, is rotated in the direction of the arrow i" whereby the coupling gears 153 engage with the driving gears 154 (Figure 18) and the register gears 155. After this drive connection has been established the racks of the value entering mechanism transfer through the shafts 154a, gears 154, coupling gears 153, and gears 155, the set amount to the number rolls 554 of the accumulator A.

During the swinging movement of the coupling gears frame 145, the nose 609 Figures 15 and 18) rigidly connected with it, has released the lever 608, whereby this in consequence of its own weight likewise swings out in the clockwise direction its lug 608a, releases the ledge 607 of the resetting or locking flap 606, so that this swings in anti-clockwise direction round its pins 606a, and unlocks the finger 559z of all the preparatory members 559.

After these operations have taken place, the value transference to the gears 155 of the numeral wheel shafts 556 is effected by the gears 154 through the coupling gears 153, whereby naturally also the numeral wheels 554 are correspondingly rotated and, of course, in the direction of the arrow L (seen in Figure 18).

In this value transference, as soon as one of the numeral wheels 554, shifts from "9" to "0", the tens carrying nose 155g of the gear 155 acts on the inclined face 155b, of the preparatory member 559 and displaces the same in the direction of the arrow Pl. This displacement movement of the preparatory member 559 may execute unimpeded in consequence of the preceding release of its finger 559z by the resetting or locking flap 606. In the displacement of the preparatory member 559, in the direction of the arrow Pl the ball 559k is disengaged from the stop 559g and engaged in the stop 559h, whereby the preparatory member 559 in its new position, the working position, is blocked.

By means of this process, the edge 559s of the preparatory member 559, has entered into the part of movement of inclined edge 153g (Figure 23) of the tens carrying member 133.

As soon as the value transference has been effected the coupling gears frame 145 is rotated further in the clockwise direction, whereby the coupling gears 153 are again disengaged from the gears 154 and 155. Meanwhile, however, the tens carrying shaft 19 with the eccentrics 131E rigidly connected with it has rotated so far in the direction of the arrow i that the eccentric 131E arranged in the units position acts on the foot 133x of its tens carrying member 133 and raises this. Insofar now as the appertaining preparatory member 559 has experienced no displacement in the direction of the arrow P1 the tens carrying member 133 is solely inoperative, i. e. vertically raised.

If it is now assumed that the above described displacement movement of the preparatory member 559 has taken place in the tens position here the edge 559s (Figure 15) of the preparatory slide 559, also is disposed in the path of the inclined edge 133g (Figure 23) of the appertaining tens carrying member 133. As soon now as the eccentric 131z, arranged in the tens position acts on the foot 133x of the tens carrying member 133, this is raised.

Then it strikes with its inclined edge 133g on the edge 559s (Figure 22) of the preparatory member 559 and slides off in consequence to the right as illustrated in Figure 22, whereby it with its lug 133p, engages with the gear 558 of the next higher numeral wheel 554, and rotates this for one unit further. After the gear 558 has been shifted through one unit further, the eccentric arranged in the hundreds position comes into operation, and raises the corresponding tens carrying member 133 upwards. If all the eccentrics 131 have now come into operation in the direction of the arrow i on their tens carrying members 133, so are these through the shape of the eccentrics 131 for a time held in their raised positions. Meanwhile, the coupling gear frame 145 has so far rotated in the clockwise direction that now the nose 609a of the same acts on the lever 608, and swings the latter round its rotational point 608b in the anti-clockwise direction (Figure 15). The lever 608 strikes then on the bar 607 of the resetting or locking flap 606 and swings this round its pins 606a in the clockwise direction. The resetting or locking flap 606, now comes into contact with the fingers 559z of the preparatory member 559 and so acts upon them that all the preparatory slides 559 are displaced in the opposite direction to the arrow P1 and take up their rest position as indicated in Figure 15. The balls 559k are then disengaged from the stop 559h and engaged in the stop 559g, and the resetting or locking flap 606 acts again therefore as a locking flap so that all the preparatory slides 559 are secured against a movement in the direction of the arrow P1.

As soon now as the preparatory members 559 have again taken up their rest position illustrated in Figure 15, their edges 559s have released the tens carrying members 133 so that these under the action of their springs 559p (Figure 21) are again swung to the right, whereby their lugs 133p are disengaged from the gears 558. Only then, the eccentrics 131 release simultaneously all their tens carrying members 133, so that these under the action of their springs 559p, can descend vertically into the rest positions, whereby all the parts take up the position to one another shown in Figure 15.

As the preparatory members 559 in this manner are held for the longest possible time in their working position, and the release of the tens carrying members 133 takes place only at the last instant, so a pronounced coming to rest of the lugs 133p of the tens carrying member 133 in the tooth spaces of the gears 558 is obtained whereby any overthrow movement of the same is securely avoided.

The locking of the preparatory slides 559 in the rest position of the machine according to Figure 15, has the object to avoid an over-rotation of the numeral wheels from "9" to "0" or vice versa in setting by means of the whorl W.

As already described on the depression of the addition key 4, the key locking bar 271 (Figure 13) is swung in the anti-clockwise direction, whereby it contacts against the projections 514a of the key locking bars 514 (Figure 18) so that it is not possible to depress a key K. In order also to maintain this locking during the calculating operation, independent of the holding of the addition key 4 depressed the following arrangement is provided.

After the depression of addition key 4, the crank disc 117 (Figures 13 and 18) acts with its surface on the lug 117h of the lever 117m, and swings the same and the lever 117p rigidly connected with it, in the clockwise direction, round the shaft 117k. With this the lever 117p now places itself upwards against the key locking bar 271 and prevents the depression of a key during the calculating operation.

As already described, the lever 265 (Figure 13) is swung on the pressing of the key 4, against the action of its spring 267, in the clockwise direction. As through its swinging movement, through the parts 269, 270, 271, 284, 285, 286 and 43, (Figures 4, 5 and 13) the clutch 52 for the value entering mechanism is closed and through the parts 292, 291, 295 and 22a the motor contacts 300, 302 are closed, so these parts naturally remain closed so long as the key 4 is held depressed. Consequently, when the key 4 is held depressed unintentionally, the amount set is unintentionally repeatedly transferred to the accumulator A. In order to avoid this, precautions must be taken that also in the holding of the key 4 in the depressed position, the machine only makes one revolution. With this object in view the levers 265 and 275, as already mentioned, are so positioned that, after approximately half a rotation of the crank disc 117, they are pushed by the connecting rod 124, (as is shown in Figure 13) to the right (considered from the front of the machine), and of course so far that they, under the pull of the spring 267, engaging with the lever 265, can rise so high laterally of the pin 262 of the key stem 239 that the projection 265a of the lever 265 contacts with the edge 271a of the key locking bar. If the key 4 by mistake is freed and again depressed, it remains inoperative on the lever 265 as it cannot be engaged by its pin 262.

As soon now as the lever 117m (Figures 13 and 18) can again engage with its nose 117h in the groove 117g of the crank disc 117, the key locking bar 271 is able under its own weight and by the action of the spring 267, through the projection 265a, and of the spring 284a through the projection 283, to return to its rest position, whereby the parts 284, 285, 286, 289 and 43 also return to their rest position. With this, the clutch tripping dog 43 comes again into the path of the nose 70 of the clutch pawl 65, so that this on its nose 70 striking the clutch tripping dog 43 disengages the clutch after one rotation.

If the face 290 (Figure 13) of the arm 289a of the three-armed lever 289 has released the roller 292, so also the parts 291, 295, and 22 return into their rest position under the action of the spring 297, as soon as the lever 21 at a suitable moment slides on the cam 20 at 20g. When this is effected the cam 20 swings the lever 22 in the clockwise direction, whereby the contact spring 299 is pressed together, and the contact 300—302 is opened, so that the motor D again comes to rest. If the curve 20h has swung out the lever 22 completely, it slides under the action of the spring 295b again on to the conical periphery of the cam 23.

On the release of the addition key 4, the lever 265, (Figure 13) under the simultaneously laterally-acting spring pull of the spring 267 slides again underneath the pin 262 of the key stem 239. The value set in the keyboard therefore appears in the accumulator A and in the revolution counter RC a "1" is visible.

The cancelling arrangement for the set keys acts in the following manner:—

On the depression of the addition key 4, the lug 282 bent on the lever 275 (Figures 13 and 14) acts on a lug 307 of the lever 308. The lever 308 is thereby swung whereby the lug 307 slides along the edge of a lever 317. A key resetting bar 318 (Figure 14) connected with the lever 317 strikes then on the projection 514a of the key locking bar 514, whereby as the springs 514b connected to the key locking bar are together stronger than the spring 314 connected to the lever 308 (Figure 14) the lever 308 is displaced against the action of its spring 314 in the direction of the arrow n into the position illustrated in dotted lines in Figure 14. In this downward sliding movement the lug 307 swings the locking lever 320 in the clockwise direction against the action of the spring 322. When the lug 307 comes underneath the locking lever 320, so the lever 320 is swung by the spring 322 in the anti-clockwise direction and places itself over the lug 307 whereby the lever 308 is held in its position in Figure 14 indicated by dotted lines, even if the lug 282 of the lever 275 releases the lug 307. Through the movement of the lever 308 in the direction of the arrow n, the lever 310 jointed to it is also swung into the position indicated in dotted lines, so that its nose 311 is disposed in the path of the nose 312 of the cam disc 313 rotating in the direction of the arrow i.

Towards the end of the rotation of the cam disc 313, (Figure 14) the lever 310, jointed to the lever 308 is acted on by the nose 312 of the cam disc 313 in the anti-clockwise direction, whereby the rod 308 is carried along in the direction of the arrow a. As the locking lever 320 in consequence of its contact with the pin 324 does not let the lug 307 of the lever 308 slide away upwards, the arm 317 is thus swung by the lug 307 in a clockwise direction and therefore also the key resetting bar 318, (Figure 14) which on its side acts on an extension 514a of the key locking bar 514 and displaces this against the action of its spring 514b, whereby the set keys after one rotation of the clutch 52 for the value entering mechanism, as soon as the extensions 514a are released by the key locking bar 271 likewise are released. As soon then as the nose 307 on the locking lever 317 has moved past, the rod 308 through its spring 314 is drawn back into its normal position illustrated by the drawn out lines in Figure 14.

If the amount set is to be transferred several times to the accumulator A, so it is necessary to swing the lever 9 (Figure 13) into the position represented in Figure 13, whereby the lever 275 jointed on the lever 9, likewise takes up the position represented in this figure, to the pin 273 of the lever 265. If the pin 262 of the key stem 239 acts now on the depression of the addition key 4 on the lever 265, so this is swung in the clockwise direction round a pin 264, the pin 273 of the lever 265 is able to slide inoperative in the slot 274 of the lever 275. The lever 275 places itself with its lug 276 on the pin 239a, so that it is held in its rest position illustrated in Figure 13, and the face 274a does not come into the path of movement of the head 125 of the connecting rod 124. In consequence of this so long as the addition key 4 is held depressed, the amount set in each rotational movement is transferred into the accumulator R. A resetting of the keys K can likewise not occur, as the lug 282 of the lever 275 cannot operate on the lug 307 of the rod 308.

After therefore the movements proceeding from the depression of the addition key has been gone into, in the following, the locking operations which take place of other parts will now be described.

First it may be mentioned that on the depression of the addition key 4, a depression of the subtraction key 5 is not possible, as the pin 358 of the subtraction key stem 353 is supported on the face 246a of the shift lever 246, which is held swung in anti-clockwise direction by the addition key 4.

Operation of subtraction

The operations in subtraction are substantially the same as in addition. They are differentiated only from addition in this: that in the depression of the subtraction key 5 (Figure 13), the pin 358 acts on the face 246a, of the shift lever 246 and swings this in the clockwise direction. The fork-shaped part of the shift lever 246, which embraces the pin 249 of the lever 248, rigidly connected to the shaft 251 acts on the lever 248 in the anti-clockwise direction and simultaneously swings the shaft 251 and the counter state control crank 252 in the same direction, and of course into the position illustrated in Figure 20. The counter state control crank 252 now acts with its stop 254a on the pin 256 riveted on to the counter state control bar 255, whereby the pin 257 of said bar 255 and the face 253b of the recess 253, move towards one another and come into contact with one another. The counter state control bar 255 is hereby displaced in the opposite direction to the arrow a, the draw key setting bell crank 167, 169 (Figure 7) rotated in the clockwise direction into the position represented in Figure 7, and thereby through the ring groove 170 of the draw key 130, 163, now coupled by means of the draw key sleeve 156 with the gear 129, whilst the toothed wheel 157 runs inoperative on the draw key sleeve 156 of the gear 171. The gear 128 disposed on the tens carrying shaft 19, now transmits the rotational movement immediately through the gear 129 to the gear 171, and finally to the gear 173 and the tens carrying shaft 172, whilst the gears 181, 183 and 157 rotate idly with them. The tens carrying shaft 172 (Figure 6a) is hereby rotated in the opposite direction to the arrow *j*, i. e., in the opposite direction to that in which it rotates for addition, so that the revolution counter RC operates in the subtractive sense.

In this rotation of said shaft 172, the inclined area 184S of the shift lug 185 (Figure 6b) acts on the tooth 204x of the star gear 204a positioned furthest to the right, and rotates this in the opposite direction to the arrow *k* for a whole division. The gear 206 (Figure 6c) in fixed relation with the star gear 204a is hereby likewise rotated in the reverse direction to that of the arrow *k*, and as this is in engagement with the gear 208 fixed to the numeral wheel 205 of the revolution counter RC so this and therefore the numeral wheel 205 are rotated for a whole unit in the opposite direction to the arrow *m*, i. e. in the subtractive sense. The addition lug 186, which stands in the way at the end of the complete rotation of the shaft 172, is through the action of the tooth 204x then taking the place of the tooth 204y of the star gear 204, pressed back on the notch 190 of the lug 186 against the action of its spring 195.

A rotation of the star gear 204a, in consequence of the positive guide for this gear given by the notch 190 and the transport piece 184 cannot take place.

As the tens transfer in the revolution counter RC under the heading "Addition" was described in detail a further investigation of the same at this place may be omitted. It should be here mentioned that in subtraction the inclined surfaces indicated with the index S of the transport pieces 184a to 184g, act as then to effect generally all rotational movements in the reverse directions to that in addition.

The lever 325 rigidly mounted on the shaft 251 (Figure 13) is likewise acted on in the anti-clockwise direction and displaces the pin 326 in the opposite direction to that of the arrow *a* whereby the pin 326 couples the rack 331, so that the value entering mechanism is set for subtraction in the manner known by U. S. Patent 1,011,617. Accordingly the subtraction process is carried out by addition of the complementary number of the subtrahend in the accumulator A. Naturally, exactly as in addition in subtraction, also at any time after the setting of the lever 9 on A or M, by depression of the subtraction key 5, either independently of holding the subtraction key depressed only one movement of the differential mechanism or corresponding to the duration of depression of the subtraction key 5, any desired number of movements can be effected.

In the depression of the subtraction key 5, the individual locking devices act as follows: As already described when the shift lever 246, Figure 13, is swung in the clockwise direction the pin 244 of the addition key stem 239 is supported on the face 245 of the shift lever 246, so that a depression of addition key 4 is impossible.

What I claim is:—

1. In a calculating machine, add and subtract keys, value entering mechanism having a cycle of movement, driving means for said value entering mechanism, said driving means including a crank and a connecting rod, means for rendering said driving means effective, a member operated upon depression of each of said keys for operating said rendering means, a settable member movable into the path of the crank and displaceable thereby, means connecting the first mentioned member with the settable member whereby both said members may be displaced by said crank, said displacement of the first member disconnecting the latter from the depressed key to limit the value entering mechanism to a single cycle of movement irrespective of whether the add or subtract key is held depressed or not, and restoring means acting to return said members after displacement.

2. In a calculating machine, add and subtract keys, value entering mechanism having a cycle of movement, driving means for said value entering mechanism, said driving means including a crank and a connecting rod, means for rendering said driving means effective, a member operated upon depression of each of said keys for operating said rendering means, means mounting said member for lateral movement whereby said member may be moved out of operative relation to said keys, a settable member movable into the path of the crank and displaceable thereby, means connecting the first mentioned member with the settable member whereby both said members may be displaced by said crank, said displacement of the first member moving the latter out of operative relation to the depressed key to limit the value entering mechanism to a single cycle of movement irrespective of whether the add or subtract key is held depressed or not, and restoring means acting to return said members after displacement.

3. A calculating machine as claimed in claim 1 characterized in that said connecting means includes a pin and slot connection between said members.

4. A calculating machine as claimed in claim 2 characterized in that said connecting means includes a pin and slot connection between said members.

5. A calculating machine as claimed in claim 1 characterized in that said connecting means includes a pin carried by the first mentioned member and an angular slot in the settable member receiving said pin.

AUGUST FRIEDRICH POTT.